(12) United States Patent
Ben Shem (10) Patent No.: US 11,460,559 B2
(45) Date of Patent: Oct. 4, 2022

(54) Q/I CALCULATION CIRCUIT AND METHOD FOR TIME-OF-FLIGHT IMAGE SENSOR

(71) Applicant: Sony Semiconductor Solutions Corporation, Kanagawa (JP)

(72) Inventor: Ariel Ben Shem, Hasharon (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 368 days.

(21) Appl. No.: 16/836,194

(22) Filed: Mar. 31, 2020

(65) Prior Publication Data

US 2021/0215806 A1 Jul. 15, 2021

Related U.S. Application Data

(60) Provisional application No. 62/931,397, filed on Jan. 15, 2020.

(51) Int. Cl.
*G01S 7/4865* (2020.01)
*G01S 7/4863* (2020.01)
*G01S 17/894* (2020.01)

(52) U.S. Cl.
CPC .......... *G01S 7/4865* (2013.01); *G01S 7/4863* (2013.01); *G01S 17/894* (2020.01)

(58) Field of Classification Search
CPC ..... G01S 7/4865; G01S 7/4863; G01S 17/894
See application file for complete search history.

(56) References Cited

U.S. PATENT DOCUMENTS

2016/0356718 A1* 12/2016 Yoon ..................... H03M 3/464

* cited by examiner

*Primary Examiner* — Thanh Luu
(74) *Attorney, Agent, or Firm* — Michael Best & Friedrich LLP (57) ABSTRACT

A time-of-flight device comprises a pixel array including an array of pixel circuits respectively including a photodiode, a first tap, and a second tap; a first signal line coupled to the first tap; a second signal line coupled to the second tap; and processing circuitry coupled to the first signal line and the second signal line, the processing circuitry including: a first comparator configured to receive a first phase signal, to receive a reference signal having an exponential waveform, and to output a first comparison signal, a second comparator configured to receive a second phase signal, to receive the reference signal, and to output a second comparison signal, and a counter configured to perform a count based on the first comparison signal and the second comparison signal.

20 Claims, 5 Drawing Sheets

Q/I CALCULATION CIRCUIT AND METHOD FOR TIME-OF-FLIGHT IMAGE SENSOR

BACKGROUND OF THE INVENTION

1. Field of the Invention

This application relates generally image sensors. More specifically, this application relates to a system and method for distance and depth determination in a time-of-flight (TOF) image sensor.

2. Description of Related Art

Image sensing devices typically include an image sensor, generally implemented as an array of pixel circuits, as well as signal processing circuitry and any associated control or timing circuitry. Within the image sensor itself, charge is collected in a photoelectric conversion device of the pixel circuit as a result of the impingement of light. There are typically a very large number of individual photoelectric conversion devices (e.g. tens of millions), and many signal processing circuitry components working in parallel. Various components within the signal processing circuitry are shared by a large number of photoelectric conversion devices; for example, a column or multiple columns of photoelectric conversion devices may share a single analog-to-digital converter (ADC) or sample-and-hold (S/H) circuit.

BRIEF SUMMARY OF THE INVENTION

Various aspects of the present disclosure relate to an image sensor and distance determination method therein.

In one aspect of the present disclosure, there is provided a time-of-flight sensor, comprising: a pixel array including a plurality of pixel circuits arranged in an array, respective ones of the plurality of pixel circuits include a photodiode, a first tap, and a second tap; a first signal line coupled to the first tap; a second signal line coupled to the second tap; and processing circuitry coupled to the first signal line and the second signal line, the processing circuitry including: a first comparator configured to receive a first phase signal based on a first output from the first tap and a first output from the second tap, to receive a reference signal having an exponential waveform, and to output a first comparison signal, a second comparator configured to receive a second phase signal based on a second output from the first tap and a second output from the second tap, to receive the reference signal, and to output a second comparison signal, and a counter configured to perform a count based on the first comparison signal and the second comparison signal.

In another aspect of the present disclosure, there is provided a time-of-flight system, comprising: a light source configured to emit a light; and a sensor comprising: a pixel array including a plurality of pixel circuits arranged in an array, respective ones of the plurality of pixel circuits include a photodiode, a first tap, and a second tap, a first signal line coupled to the first tap, a second signal line coupled to the second tap, and processing circuitry coupled to the first signal line and the second signal line, the processing circuitry including: a first comparator configured to receive a first phase signal based on a first output from the first tap and a first output from the second tap, to receive a reference signal having an exponential waveform, and to output a first comparison signal, a second comparator configured to receive a second phase signal based on a second output from the first tap and a second output from the second tap, to receive the reference signal, and to output a second comparison signal, and a counter configured to perform a count based on the first comparison signal and the second comparison signal.

In another aspect of the present disclosure, there is provided a system, comprising: a first sensor configured to generate an image data, the first sensor comprising a first pixel array; and a second sensor configured to generate a distance data, the second sensor comprising: a second pixel array including a plurality of pixel circuits arranged in an array, respective ones of the plurality of pixel circuits include a photodiode, a first tap, and a second tap, a first signal line coupled to the first tap, a second signal line coupled to the second tap, and processing circuitry coupled to the first signal line and the second signal line, the processing circuitry including: a first comparator configured to receive a first phase signal based on a first output from the first tap and a first output from the second tap, to receive a reference signal having an exponential waveform, and to output a first comparison signal, a second comparator configured to receive a second phase signal based on a second output from the first tap and a second output from the second tap, to receive the reference signal, and to output a second comparison signal, and a counter configured to perform a count based on the first comparison signal and the second comparison signal.

As such, various aspects of the present disclosure provide for improvements in at least the technical field of depth sensing, as well as the related technical fields of imaging, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed systems and methods can be used in any device in which there is a need to detect distance in a wave-based sensor; for example, an audio circuit, phononic sensor, a radar system, and the like.

Imaging System

Figure 1A:
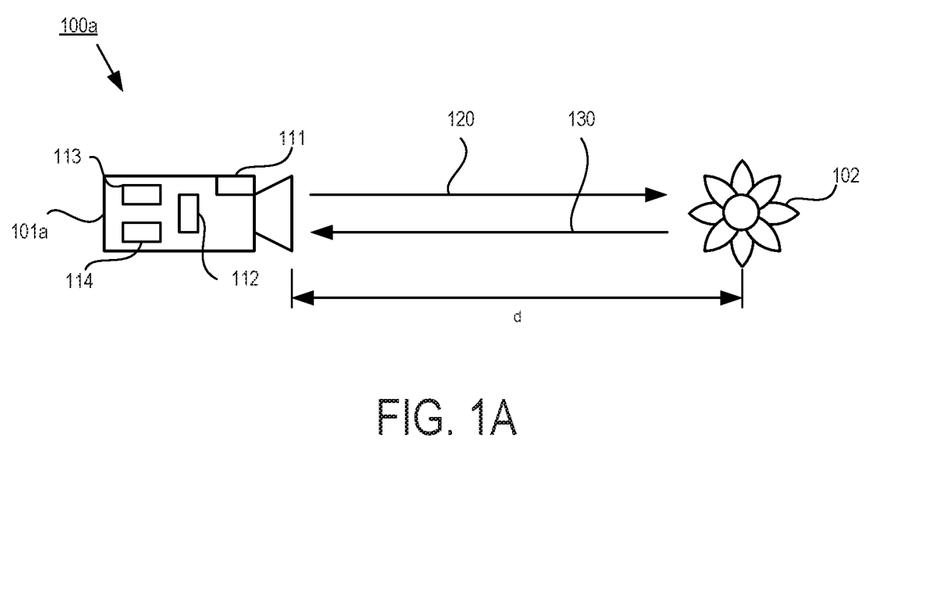
FIGS. 1A and 1B illustrate exemplary TOF systems according to various aspects of the present disclosure.

FIG. 1A illustrates a first example 100a of a TOF imaging system 101a configured to detect and/or an object 102 located a distance d away. The TOF imaging system 101a includes a light generator 111 configured to generate an emitted light wave 120 toward the object 102 and a TOF image sensor 112 configured to receive a reflected light wave 130 from the object 102. The emitted light wave 120 may have a periodic waveform. The TOF image sensor 112 may be any device capable of converting incident radiation into signals. For example, the TOF image sensor 112 may be implemented by a Complementary Metal-Oxide Semiconductor (CMOS) Image Sensor (CIS), a Charge-Coupled Device (CCD), and the like. The TOF imaging system 101a may further include distance determination circuitry such as a controller 113 (e.g., a CPU) and a memory 114, which may operate to perform one or more examples of time-of-flight processing as described further below.

Figure 1B:
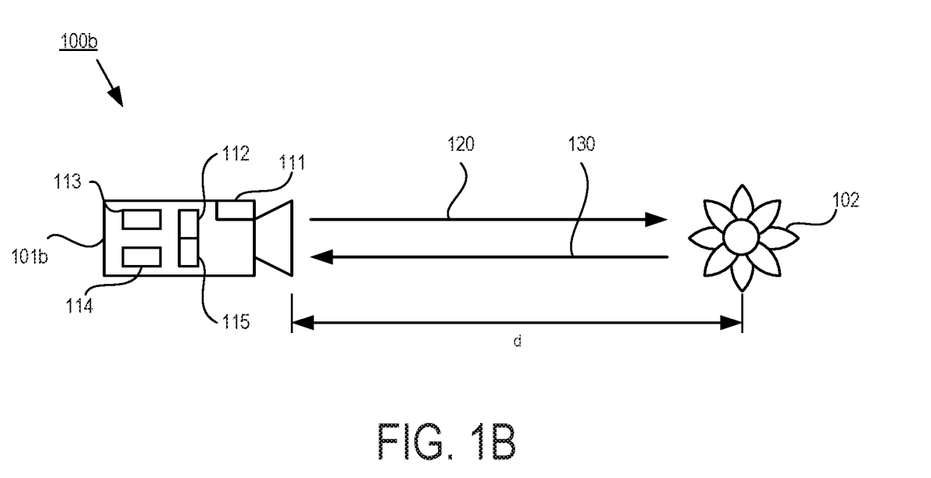

FIG. 1B illustrates a second example 100b of a TOF imaging system 101b configured to detect and/or image an object 102 located a distance d away. The TOF imaging system 101b includes a light generator 111 configured to generate an emitted light wave 120 toward the object 102, a TOF image sensor 112 configured to receive a reflected light wave 130 from the object 102, and an RGB image sensor 115 configured to capture an RGB image of the object 102. The emitted light wave 120 may have a periodic waveform. The TOF image sensor 112 may be any device capable of converting incident radiation into signals. For example, the TOF image sensor 112 and the RGB sensor 115 may each be implemented by a Complementary Metal-Oxide Semiconductor (CMOS) Image Sensor (CIS), a Charge-Coupled Device (CCD), and the like. While the second example 100b is described with reference to an RGB image sensor 115, in practice the image sensor 115 may capture a monochromatic image or may include color filters different from RGB. Furthermore, while FIG. 1B illustrates the TOF image sensor 112 and the RGB image sensor 115 as separate components, in some aspects of the present disclosure the TOF image sensor 112 and the RGB image sensor 115 may be integrated as a single chip and/or utilize a single pixel array. The TOF imaging system 101b may further include distance determination and processing circuitry such as a controller 113 (e.g., a CPU) and a memory 114, which may operate to perform one or more examples of time-of-flight and image processing as described further below.

The light generator 111 may be, for example, a light emitting diode (LED), a laser diode, or any other light generating device or combination of devices, and the light waveform may be controlled by the controller 113. The light generator may operate in the infrared range so as to reduce interference from the visible spectrum of light, although any wavelength range perceivable by the image sensor 112 may be utilized. The controller 113 may be configured to receive an image from the image sensor and calculate a depth map indicative of the distance d to various points of the object 102.

Figure 2:
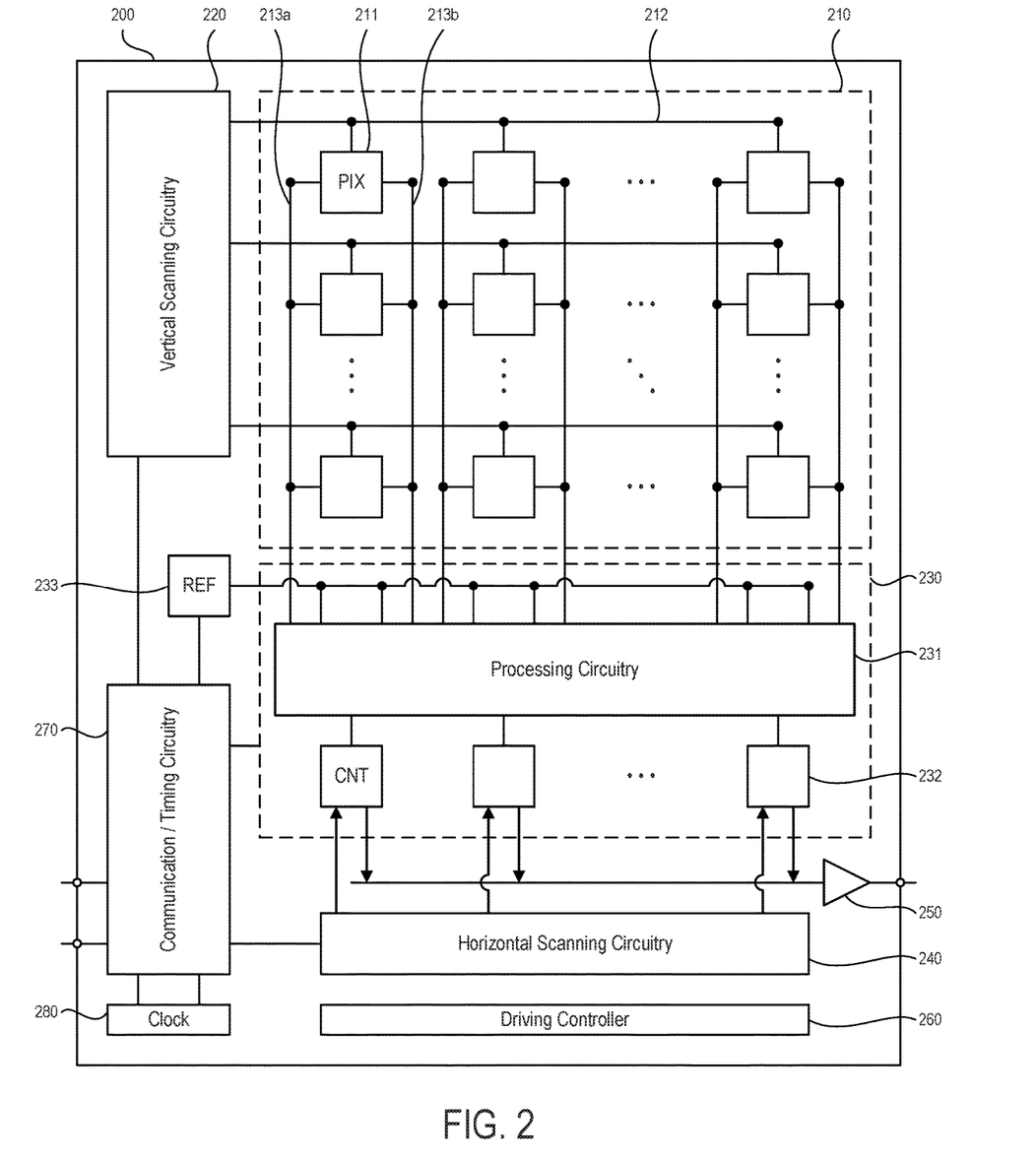
FIG. 2 illustrates an exemplary TOF sensor according to various aspects of the present disclosure.

FIG. 2 illustrates an exemplary image sensor 200 according to various aspects of the present disclosure. The image sensor 200 may be an example of the image sensor 112 illustrated in FIGS. 1A-B. As illustrated in FIG. 2, the image sensor 200 includes an array 210 of pixel circuits 211, each of which are located at an intersection where a horizontal signal line 212 and a pair of vertical signal lines 213a and 213b cross each other. The horizontal signal lines 212 are operatively connected to vertical scanning circuitry 220, also referred to as a "row scanning circuit" or a "vertical driving circuit," at a point outside of the pixel array 210. The horizontal signal lines 212 carry signals from the vertical scanning circuitry 220 to a particular row of the pixel circuits 211. While FIG. 2 illustrates a single horizontal signal line 212 for a given row of the pixel circuits 211, in practice a plurality of the horizontal signal lines 212 may be provided for each row of the pixel circuits 211.

Figure 3:
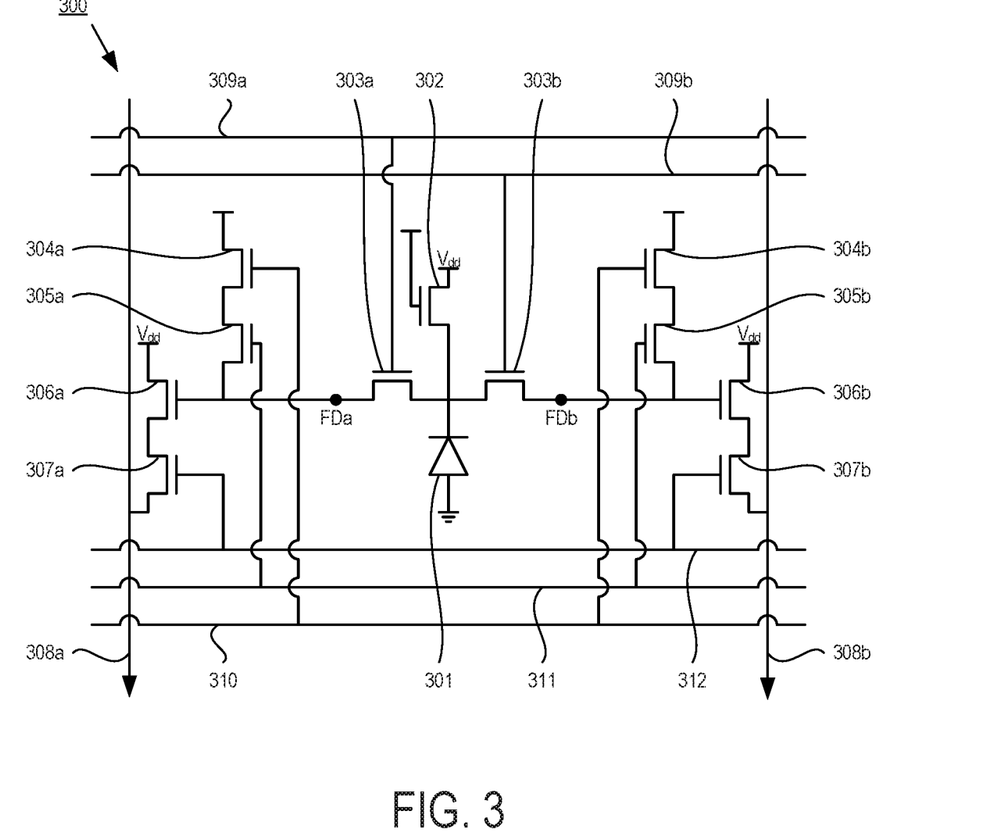
FIG. 3 illustrates an exemplary pixel circuit according to various aspects of the present disclosure.

The pixel circuits 211 store a charge corresponding to an amount of incident light alternately in floating diffusions FDa and FDb (for example, as illustrated in FIG. 3) and selectively output an analog signal corresponding to an amount of the charge to the vertical signal lines 213a and 213b in a manner that will be described in more detail below. While FIG. 2 illustrates the vertical signal lines 213a and 213b for a given pixel circuit 211 on opposite sides thereof, in practice the vertical signal lines 213a and 213b may both be provided on a single side of the given pixel circuit 211. Furthermore, for illustration purposes, only a subset of the pixel circuits 211 in the array 210 are actually shown in FIG. 2; however, in practice the image sensor 200 may have any number of the pixel circuits 211. FIG. 2 illustrates two vertical signal lines 213a and 213b for each column of the pixel circuits 211 (a "two-tap" system); however, in practice the image sensor 200 may incorporate a larger number of the vertical signal lines for each column of the pixel circuits 211.

The vertical signal lines 213a and 213b conduct the analog signals (A and B, respectively) for a particular column to a calculation and processing circuit 230, which as illustrated includes processing circuitry 231 and a plurality of counters 232. The processing circuitry 231 includes various components which will be described in more detail below, such as comparators and the like. The processing circuitry 231 receives a signal from each vertical signal line and compares the analog signal to a reference signal output from a reference signal generator 233. The reference signal generator 233 may be, for example, a digital-to-analog converter (DAC) and the reference signal may have, for example, a periodic ramp waveform. The processing circuitry 231 determines digital signals indicative of a comparison between the input analog signals from the corresponding vertical signal lines and the reference signal, performs various operations on the digital signals, and outputs a determination signal to the plurality of counters 232. In some aspects of the present disclosure, the image sensor 200 utilizes one counter 233 for each pixel column.

The calculation and processing circuit 230 may include additional components, such as latches, logic circuits, switches, S/H circuits, and the like. The calculation and processing circuit 230 may be capable of performing a method of correlated double sampling (CDS). CDS is capable of overcoming some pixel noise related issues by sampling each pixel circuit 211 twice. First, the reset voltage $V_{reset}$ of a pixel circuit 211 is sampled. This may also be referred to as the P-phase value or cds value. Subsequently, the data voltage $V_{data}$ of the pixel circuit 211 (that is, the voltage after the pixel circuit 211 has been exposed to light) is sampled. This may also be referred to as the D-phase value or light-exposed value. The reset value $V_{reset}$ is then subtracted from the data value $V_{data}$ to provide a value which reflects the amount of light falling on the pixel circuit 211. The CDS method may be performed for each tap of the pixel circuit 211.

Various components of the signal processing circuit are controlled by horizontal scanning circuitry 240, also known as a "column scanning circuit" or "horizontal driving circuit." The horizontal scanning circuitry 240 causes the signal processing circuit to output signals via an output circuit 250 for further processing, storage, transmission, and the like. The vertical scanning circuitry 220, the reference circuit generator 233, and the horizontal circuitry 240 may operate under the control of a driving controller 260 and/or communication and timing circuitry 270, which may in turn operate based on a clock circuit 280. The clock circuit 280 may be a clock generator, which generates one or more clock signals for various components of the image sensor 200. Additionally or alternatively, the clock circuit 280 may be a clock converter, which converts one or more clock signals received from outside the image sensor 200 and provides the converted clock signal(s) to various components of the image sensor 200.

FIG. 3 illustrates an exemplary pixel circuit 300 having a two-tap configuration. The pixel circuit 300 may be an example of the pixel circuit 211 illustrated in FIG. 2. As shown in FIG. 3, the pixel circuit 300 includes a photoelectric conversion device 301 (e.g., a photodiode), a pixel reset transistor 302, a first transfer transistor 303a, a second transfer transistor 303b, a first floating diffusion FDa, a second floating diffusion FDb, a first tap reset transistor 304a, a second tap reset transistor 304b, a first intervening transistor 305a, a second intervening transistor 305b, a first amplifier transistor 306a, a second amplifier transistor 306b, a first selection transistor 307a, and a second selection transistor 307b. The photoelectric conversion device 301, the first transfer transistor 303a, the first tap reset transistor 304a, the first intervening transistor 305a, the first amplifier transistor 306a, and the first selection transistor 307a are controlled to output an analog signal (A) via a first vertical signal line 308a, which may be an example of the vertical signal line 213a illustrated in FIG. 2. This set of components may be referred to as "Tap A." The photoelectric conversion device 301, the second transfer transistor 303b, the second tap reset transistor 304b, the second intervening transistor 305b, the second amplifier transistor 306b, and the second selection transistor 307b are controlled to output an analog signal (B) via a second vertical signal line 308b, which may be an example of the vertical signal line 213b illustrated in FIG. 2. This set of components may be referred to as "Tap B."

The first transfer transistor 303a and the second transfer transistor 303b are controlled by control signals on a first transfer gate line 309a and a second transfer gate line 309b, respectively. The first tap reset transistor 304a and the second tap reset transistor 304b are controlled by a control signal on a tap reset gate line 310. The first intervening transistor 305a and the second intervening transistor 305b are controlled by a control signal on a FD gate line 311. The first selection transistor 307a and the second selection transistor 307b are controlled by a control signal on a selection gate line 312. The first and second transfer gate lines 309a and 309b, the tap reset gate line 310, the FD gate line 311, and the selection gate line 312 may be examples of the horizontal signal lines 212 illustrated in FIG. 2.

In operation, the pixel circuit 300 is controlled in a time-divisional manner such that, during a first half of a horizontal period, incident light is converted via Tap A to generate the output signal A; and, during a second half of the horizontal period, incident light is converted via Tap B to generate the output signal B. The division of frame among the Tap A portion and the Tap B portion may be referred to as the phase of the tap. For example, where a horizontal period runs from 0 to t, the pixel circuit 300 may be controlled such that Tap A operates from 0 to t/2 (0 phase) and Tap B operates from t/2 to t (180 phase), such that Tap A operates from t/4 to 3t/4 (90 phase) and Tap B operates from 0 to t/4 and from 3t/4 to t (270 phase), such that Tap A operates from t/2 to t and Tap B operates from 0 to t/2, or such that Tap A operates from 0 to t/4 and from 3t/4 to t and Tap B operates from t/4 to 3t/4.

While FIG. 3 illustrates the pixel circuit 300 having a plurality of transistors in a particular configuration, the current disclosure is not so limited and may apply to a configuration in which the pixel circuit 300 includes fewer or more transistors as well as other elements, such as additional capacitors, resistors, and the like.

Q and I Calculation Using Linear Reference Signal

Under the time-divisional pixel operation described above, the quantities Q and I for the pixel circuit 300 may be defined, in which the quantities Q and I are subsequently converted to a 3D description (for example, in the calculation and processing circuit 230 or in additional circuitry disposed after the output circuit 250). In some comparative examples, four frames would be needed in order to calculate the quantities Q and I according to the following expressions (1a) and (1b), respectively:

$$Q = P_0 - P_{180} \tag{1a}$$

$$I = P_{90} - P_{270} \tag{1b}$$

Above, the quantities $P_0$, $P_{90}$, $P_{180}$, and $P_{270}$ refer to phase components of the signals A and B, and may be determined according to the following expressions (2a) through (2d), respectively:

$$P_0 = A[0] - B[180] \tag{2a}$$

$$P_{90} = A[90] - B[270] \tag{2b}$$

$$P_{180} = A[180] - B[0] \tag{2c}$$

$$P_{270} = A[270] - B[90] \tag{2d}$$

Above, the quantities A[n] and B[n] refer to the n phase of the A and B taps of the pixel circuit 211, respectively. Because four phases are required, four frames must be measured in order to determine a single value for the quantities Q and I.

Figure 4:
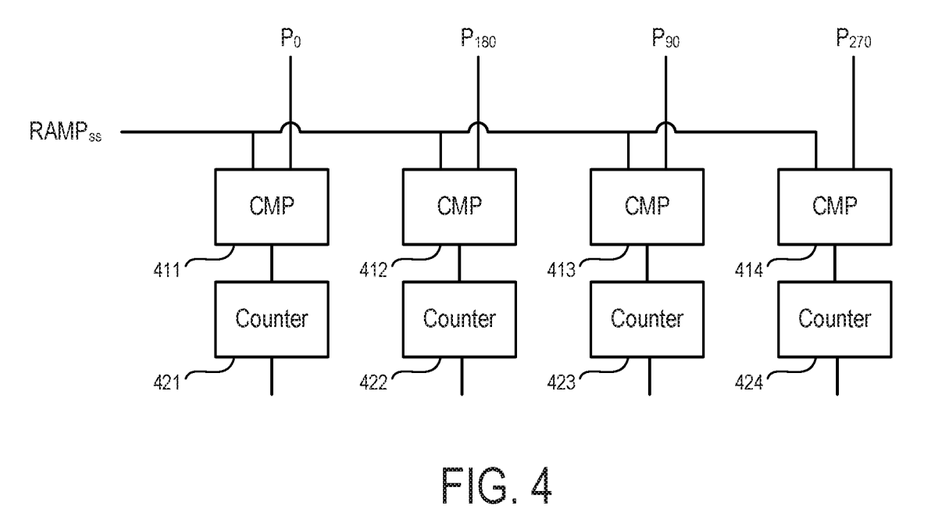
FIG. 4 illustrates a comparative example of a processing circuit.
Figure 5:
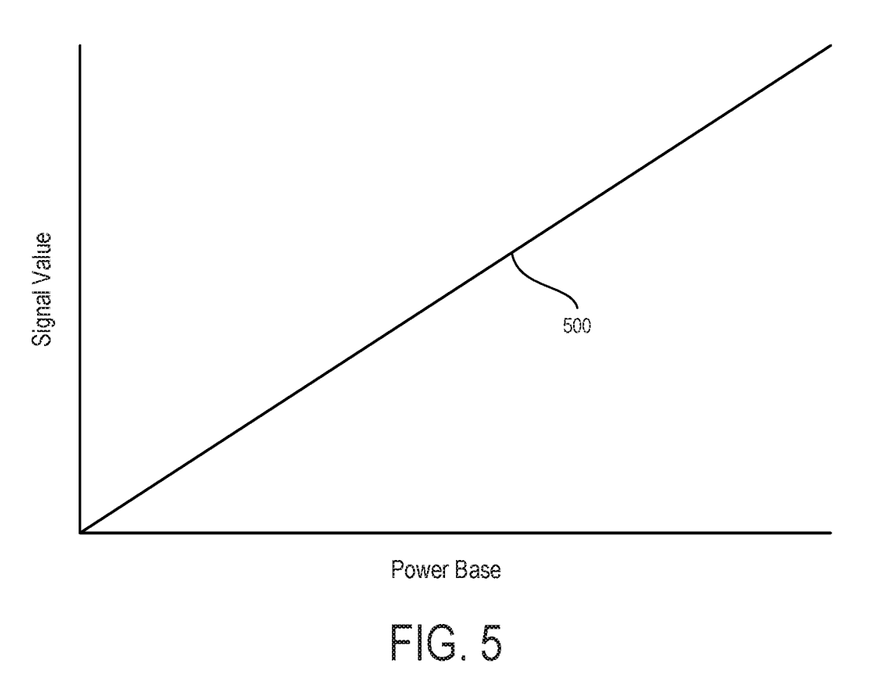
FIG. 5 illustrates an exemplary reference signal according to the processing circuit of FIG. 4.

The above quantities may be determined in a comparative example of processing circuitry, as illustrated in FIG. 4. In FIG. 4, the processing circuitry for a given column includes a first comparator 411 configured to receive a reference signal $RAMP_{SS}$ at one input and the quantity $P_0$ at the other input; a second comparator 412 configured to receive the reference signal $RAMP_{SS}$ at one input and the quantity $P_{180}$ at the other input; a third comparator 413 configured to receive the reference signal $RAMP_{SS}$ at one input and the quantity $P_{90}$ at the other input; and a fourth comparator 414 configured to receive the reference signal $RAMP_{SS}$ at one input and the quantity $P_{270}$ at the other input. The reference signal $RAMP_{SS}$ may be a single-slope ramp signal having the linear waveform 500 illustrated in FIG. 5. The outputs of the first comparator 411, the second comparator 422, the third comparator 413, and the fourth comparator 414 are provided to a first counter 421, a second counter 422, a third counter 423, and a fourth counter 424.

The comparative example processing circuitry, thus, converts four sets of phase components and subsequently calculates the quantities Q and I according to the expressions (1a) and (1b) above in the digital domain. Thus, the comparative example processing circuitry may have a high power consumption and/or may require a larger area in order to accommodate the number of counters illustrated in FIG. 4.

Q and I Calculation Using Exponential Reference Signal

In some configurations (e.g., where a source-follower transistor is shared among multiple pixel circuits), the quantities Q and I may be calculated without canceling offsets and thus only two frames may be measured. In such a configuration, expressions (1a) and (1b) above may be simplified as the following expressions (3a) and (3b), respectively:

$$Q = P_0 \qquad (3a)$$

$$I = P_{90} \qquad (3b)$$

The quantities $P_0$ and $P_{90}$ may be determined for each pixel circuit 210 in the pixel array 211 for a full resolution set of the quantities Q and I in two frames. In some implementations, however, the quantities $P_0$ and $P_{90}$ may be determined for alternating pixel circuits 210 in the pixel array 211; thus, a reduced-resolution set of the quantities Q and I may be obtained in a single frame. Where the calculation and processing circuit 230 is configured to determine $P_0$ and $P_{90}$ (that is, to subtract B[180] from A[0] and to subtract B[270] from A[90]) in the analog domain, it is possible to calculate the ratio Q/I from a single analog-to-digital conversion. Subsequently, the ratio Q/I may be subjected to the arctan function to provide an output for further processing. In some aspects of the present disclosure, a lookup table (LUT) is used to determine the value of the arctan function for a given ratio Q/I.

Any ratio may be approximated as the ratio between two exponents of the same base, where the base is greater than 1 and the exponents are integers. Here, the ratio Q/I may be approximated according to the following expression (4):

$$\frac{Q}{I} \approx \frac{B^X}{B^Y} = B^{X-Y} \qquad (4)$$

Above, B represents the base and X and Y represent the exponents. In determining Q, the smallest value of X is chosen such that $Q \leq B^X$. Similarly, in determining I, the smallest value of Y is chosen such that $I \leq B^Y$. In one example, the values Q and I may range from 1024. Therefore, the value of the base B determines the available number of quantization levels (i.e., available values of X and Y necessary to characterize the full range of Q and I), and may affect the latency of the processing circuitry 231. In expression 4, lower values of the base B will lead to a more accurate approximation.

To illustrate this, consider where B=2 which results in 10 available quantization levels. If Q=200 and I=25, X is selected to be 8 because $2^8$ is the first value larger than 200 and Y is selected to be 5 because $2^5$ is the first value larger than 25. In this example expression (4) becomes $2^{(8-5)}=2^3$, and thus the actual value of Q/I and the approximated value given by expression (4) are both equal to 8. However, if Q=300 and I=30, then X is selected to be 9 and Y is selected to be 5, resulting in an approximated value of 16. This approximated value is different from the actual value of 10.

By comparison, consider where B=65/64 (B=1.015625) which results in 448 available quantization levels. With this value of B, if Q=200 and I=25, X and Y are selected to be 341 and 207, respectively, and expression (4) gives $Q/I \approx (65/65)^{(341-207)} = 7.9849$ which is very close to the actual value of 8. If Q=300 and I=30, then X and Y are selected to be 367 and 219, respectively, and expression (4) gives $Q/I \approx 9.920$ which is also very close to the actual value of 10. Thus, the smaller value of B results in a more accurate approximation. The particular value of B is illustrative and not limiting, and other values of B (in one example, 48/47) may be utilized. Moreover, while the above examples utilize a value of B having the form (n+1)/n, where n is an integer, the present disclosure is not so limited. Preferably, the value of B is such that 1<B<1.1.

Figures 6, 7:
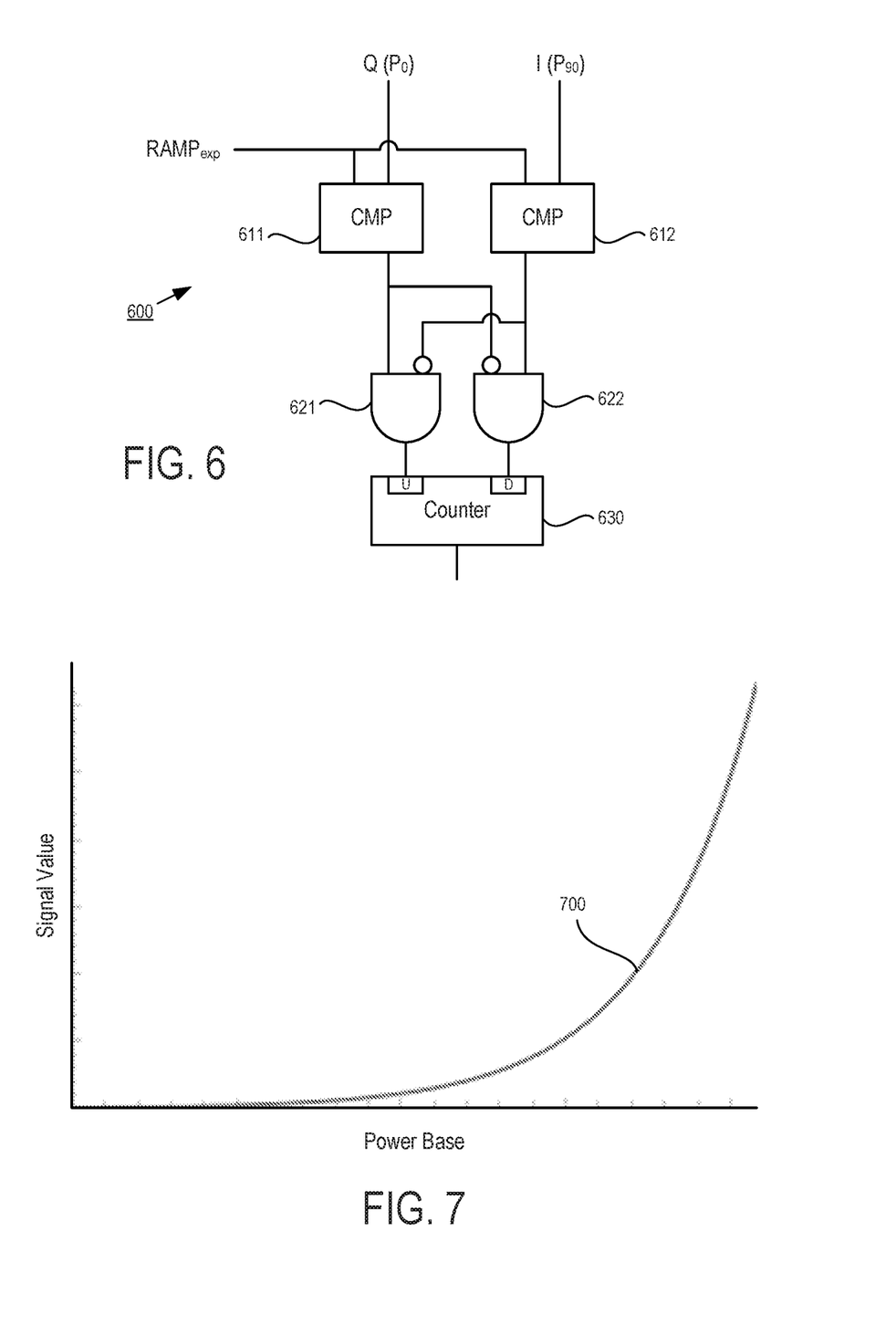
FIG. 6 illustrates an exemplary processing circuit according to various aspects of the present disclosure.
FIG. 7 illustrates an exemplary reference signal according to the processing circuit of FIG. 6.

These calculations may be implemented using the processing circuitry 600 illustrated in FIG. 6. In FIG. 6, the processing circuitry 600 for a given column includes a first comparator 611 configured to receive a reference signal $RAMP_{exp}$ at one input and the quantity $P_0$ (which corresponds to Q) at the other input, and a second comparator 612 configured to receive the reference signal $RAMP_{exp}$ at one input and the quantity $P_{90}$ (which corresponds to I) at the other input. The processing circuitry 600 includes a first logic gate 621 (an AND gate) configured to receive the output of the first comparator 611 and the inverted output of the second comparator 621, and to provide the result of the logical AND operation to an up-count input of a counter 630. The processing circuitry 600 further includes a second logic gate 622 (an AND gate) configured to receive the inverted output of the first comparator 611 and the output of the second comparator 621, and to provide the result of the logical AND operation to a down-count input of the counter 630.

The reference signal $RAMP_{exp}$ may be a ramp signal having the exponential waveform 700 illustrated in FIG. 7. The waveform 700 has the form $y=B^x$, where B is the base described above. Thus, the first comparator 611 and the second comparator 612 compare the signal values for Q and I to the exponential ramp. As illustrated in FIG. 6, by using the first logic gate 621 and the second logic gate 622, the ratio Q/I may be obtained using only one counter 630. If Q>I, the counter 630 will be begin counting when $RAMP_{exp}=I$ and will continue counting from $RAMP_{exp}=I$ to $RAMP_{exp}=Q$. If Q<I, the counter 630 will be off until $RAMP_{exp}=Q$ and will then count backwards from $RAMP_{exp}=Q$ to $RAMP_{exp}=I$. Thus, the outcome of the conversion is the difference in the power of the base B which approximates the signal Q/I as indicated in expression (4).

Compared to the comparative example illustrated in FIG. 4, the processing circuitry 600 illustrated in FIG. 6 requires less power to convert the ratio of the two analog signals, at least because only one analog-to-digital conversion is needed instead of two. In practice, the power reduction is greater than 50% on average because a single conversion in the processing circuitry 600 (done in the analog domain) is usually less intensive than a conversion in the comparative example. Moreover, the processing circuitry 600 requires half of the counters required by the comparative example, thus requiring less area on the chip. The processing circuitry may further reduce the throughput at the output stage of the sensor 200.

As noted above, the value of the base B may affect the latency of the processing circuitry 231. This may result from the comparators themselves, such as the first and second comparators 611 and 612 illustrated in FIG. 6. For example, the latency of a comparator may depend on the instantaneous slope of the reference signal RAMP$_{exp}$. The relationship between the instantaneous slope and the comparator latency for one physical implementation is illustrated in the following Table 1:

TABLE 1

| Slope (mV/µs) | Delay (ns) |
| --- | --- |
| 1.000 | 746.4 |
| 1.468 | 661.0 |
| 2.154 | 586.1 |
| 3.162 | 520.1 |
| 4.642 | 460.9 |
| 6.813 | 407.3 |
| 10.00 | 358.4 |
| 14.68 | 314.1 |
| 21.54 | 274.3 |
| 31.62 | 238.8 |
| 46.42 | 207.5 |
| 68.13 | 180.0 |
| 100.0 | 156.1 |
| 146.8 | 135.4 |
| 215.4 | 117.6 |
| 316.2 | 102.4 |
| 464.2 | 89.53 |
| 681.3 | 78.62 |
| 1000 | 69.41 |
| 1468 | 61.71 |
| 2154 | 55.34 |
| 3162 | 50.13 |
| 4642 | 45.99 |
| 6813 | 42.88 |
| 10000 | 40.69 |

The instantaneous slope S of RAMP$_{exp}$ is given by the following expression (5):

$$S = \frac{d}{dx} B^x = (\ln B) B^x \quad (5)$$

Where B=(65/64), the instantaneous slope S at the highest quantization value (448) is approximately 1038 times larger than the instantaneous slope S at the lowest quantization value (1). With reference to Table 1, the corresponding delay ranges from 40.69 ns to 358.4 ns at these endpoints, and thus the comparator delay may change by up to 318 ns within a single period of RAMP$_{exp}$. The delay may further be affected by the clock rate of the counter 630, the ADC resolution, and the like, in addition to the value of B. However, because the quantity Q/I is subsequently subjected to an arctan function, the latency difference may be mitigated. That is, when the quantities Q and I are similar in value, the latency difference is small because the instantaneous slope S is similar at Q as at I. However, when the quantities Q and I are very different in value, the latency difference will be less obvious due to the shape of the arctan function when |Q/I| is comparatively large.

In instances where the comparator latency is appreciable, both the numerator and denominator of expression (4) may be multiplied by a common gain factor α which may improve the latency for the entire range of quantization values. Additionally or alternatively, the frequency of the periodic signal RAMP$_{exp}$ may be doubled such that two cycles occur during a single Q/I calculation period. With such a signal, the maximum latency difference is reduced; however, there may be some reduction in accuracy for Q and I values near the middle of the range of available quantization values as a result.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A time-of-flight sensor, comprising:
    a pixel array including a plurality of pixel circuits arranged in an array, respective ones of the plurality of pixel circuits include a photodiode, a first tap, and a second tap;
    a first signal line coupled to the first tap;
    a second signal line coupled to the second tap; and
    processing circuitry coupled to the first signal line and the second signal line, the processing circuitry including:

a first comparator configured to receive a first phase signal based on a first output from the first tap and a first output from the second tap, to receive a reference signal having an exponential waveform, and to output a first comparison signal, a second comparator configured to receive a second phase signal based on a second output from the first tap and a second output from the second tap, to receive the reference signal, and to output a second comparison signal, and a counter configured to perform a count based on the first comparison signal and the second comparison signal.

2. The time-of-flight sensor according to claim 1, wherein the processing circuitry further includes:

a first logic circuit configured to perform an AND operation on the first comparison signal and an inversion of the second comparison signal, and to output a first logic signal, and a second logic circuit configured to perform an AND operation on the second comparison signal and an inversion of the first comparison signal, and to output a second logic signal, and the counter is configured to receive the first logic signal at an up-count input terminal and the second logic signal at a down-count input terminal.

3. The time-of-flight sensor according to claim 1, wherein the counter is configured to output a count signal corresponding to a value of the first phase signal divided by a value of the second phase signal.

4. The time-of-flight sensor according to claim 3, wherein the processing circuitry is configured to calculate an arctangent of a value of the count signal.

5. The time-of-flight sensor according to claim 3, wherein the processing circuitry is configured to determine an arctangent of a value of the count signal by referencing a lookup table.

6. The time-of-flight sensor according to claim 1, wherein a base of the exponential waveform has the form (n+1)/n, where n is an integer.

7. The time-of-flight sensor according to claim 1, wherein a base of the exponential waveform is greater than 1 and less than 1.1.

8. The time-of-flight system according to claim 1, wherein the first phase signal and the second phase signal are multiplied by a common gain factor.

9. A time-of-flight system, comprising:
a light source configured to emit a light; and
a sensor comprising:
a pixel array including a plurality of pixel circuits arranged in an array, respective ones of the plurality of pixel circuits include a photodiode, a first tap, and a second tap,
a first signal line coupled to the first tap,
a second signal line coupled to the second tap, and
processing circuitry coupled to the first signal line and the second signal line, the processing circuitry including:
a first comparator configured to receive a first phase signal based on a first output from the first tap and a first output from the second tap, to receive a reference signal having an exponential waveform, and to output a first comparison signal,
a second comparator configured to receive a second phase signal based on a second output from the first tap and a second output from the second tap, to receive the reference signal, and to output a second comparison signal, and
a counter configured to perform a count based on the first comparison signal and the second comparison signal.

10. The time-of-flight system according to claim 9, wherein
the processing circuitry further includes:
a first logic circuit configured to perform an AND operation on the first comparison signal and an inversion of the second comparison signal, and to output a first logic signal, and
a second logic circuit configured to perform an AND operation on the second comparison signal and an inversion of the first comparison signal, and to output a second logic signal, and
the counter is configured to receive the first logic signal at an up-count input terminal and the second logic signal at a down-count input terminal.

11. The time-of-flight system according to claim 9, wherein the counter is configured to output a count signal corresponding to a value of the first phase signal divided by a value of the second phase signal.

12. The time-of-flight system according to claim 11, wherein the processing circuitry is configured to calculate an arctangent of a value of the count signal.

13. The time-of-flight system according to claim 11, wherein the processing circuitry is configured to determine an arctangent of a value of the count signal by referencing a lookup table.

14. The time-of-flight system according to claim 9, wherein a base of the exponential waveform has the form (n+1)/n, where n is an integer.

15. The time-of-flight system according to claim 9, wherein a base of the exponential waveform is greater than 1 and less than 1.1.

16. The time-of-flight system according to claim 9, wherein the first phase signal and the second phase signal are multiplied by a common gain factor.

17. The time-of-flight system according to claim 9, wherein the light source is a laser diode or a light emitting diode.

18. The time-of-flight system according to claim 9, wherein the light has a wavelength in an infrared range.

19. A system, comprising:
a first sensor configured to generate an image data, the first sensor comprising a first pixel array; and
a second sensor configured to generate a distance data, the second sensor comprising:
a second pixel array including a plurality of pixel circuits arranged in an array, respective ones of the plurality of pixel circuits include a photodiode, a first tap, and a second tap,
a first signal line coupled to the first tap,
a second signal line coupled to the second tap, and
processing circuitry coupled to the first signal line and the second signal line, the processing circuitry including:
a first comparator configured to receive a first phase signal based on a first output from the first tap and a first output from the second tap, to receive a reference signal having an exponential waveform, and to output a first comparison signal,
a second comparator configured to receive a second phase signal based on a second output from the first tap and a second output from the second tap, to receive the reference signal, and to output a second comparison signal, and a counter configured to perform a count based on the first comparison signal and the second comparison signal.

20. The system according to claim 19, wherein a base of the exponential waveform is greater than 1 and less than 1.1.

* * * * *